Jan. 14, 1969  C. A. CASE  3,422,010
METHOD AND APPARATUS FOR TREATING FLOWING
SEWAGE IN A NITRIFICATION LINE
Filed March 25, 1965
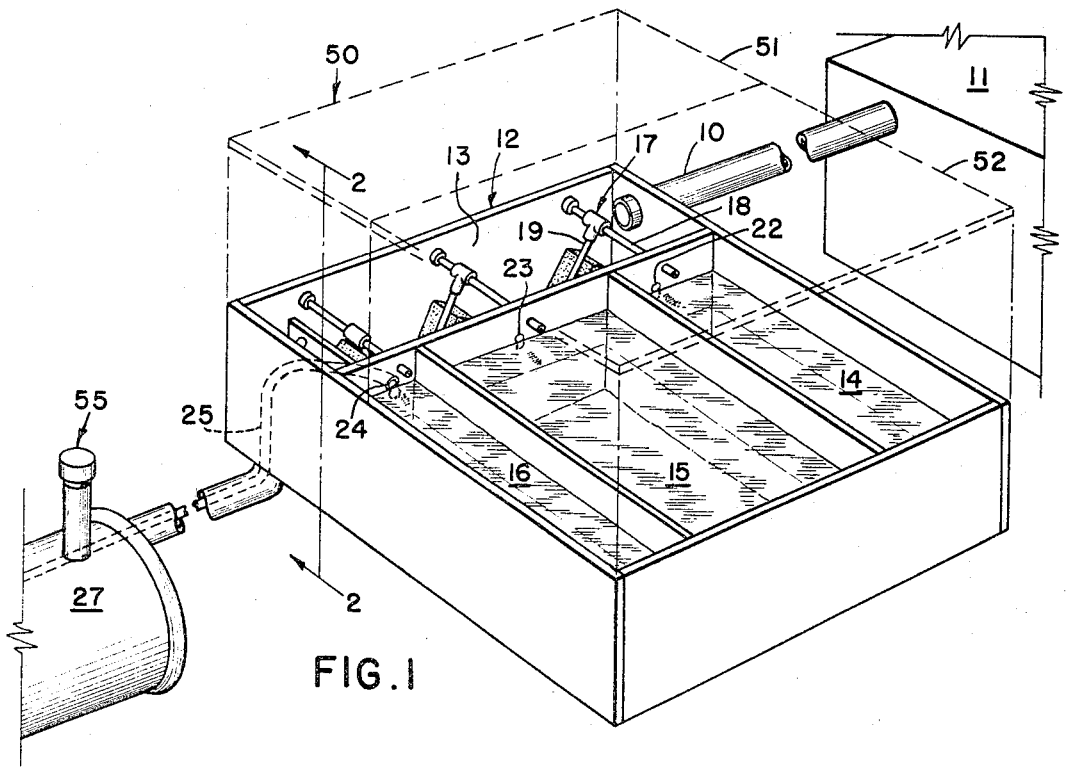
FIG.1
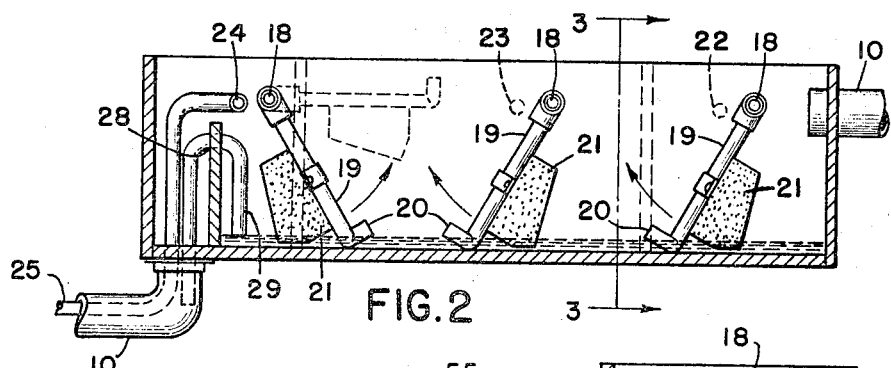
FIG.2
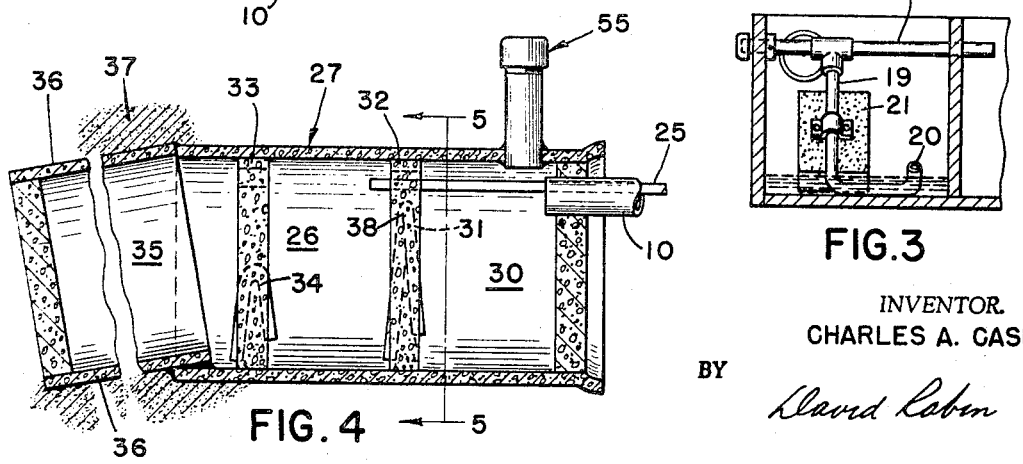
FIG.4
FIG.3
INVENTOR.
CHARLES A. CASE
BY
David Robin

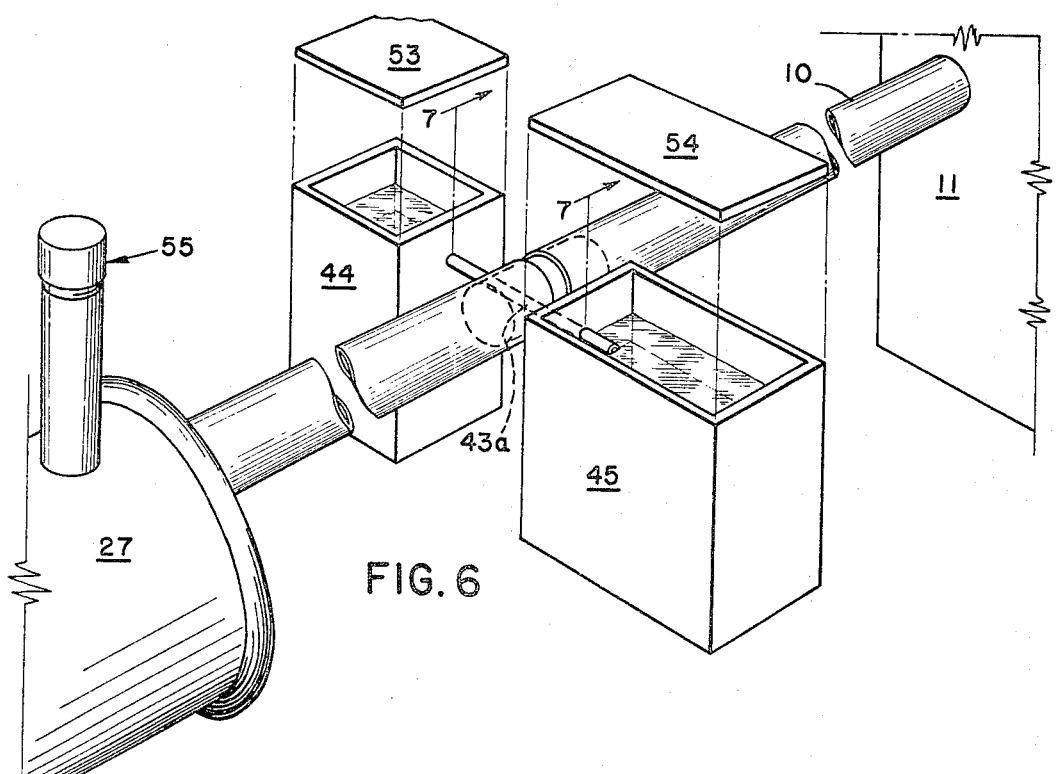
FIG. 6
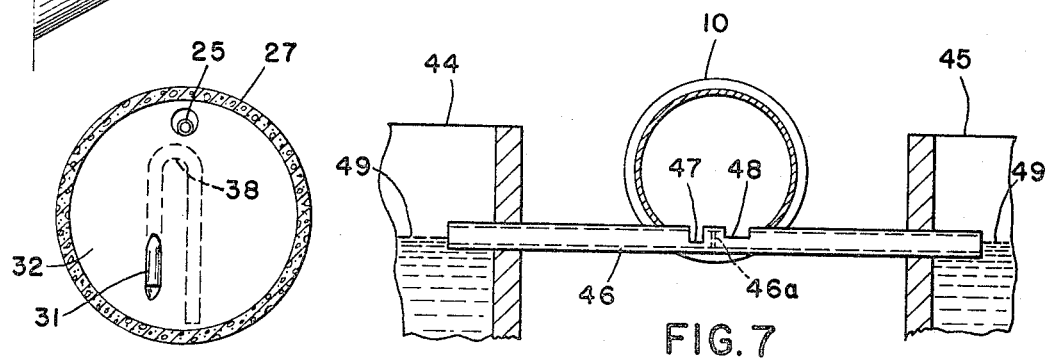
FIG. 5
FIG. 7
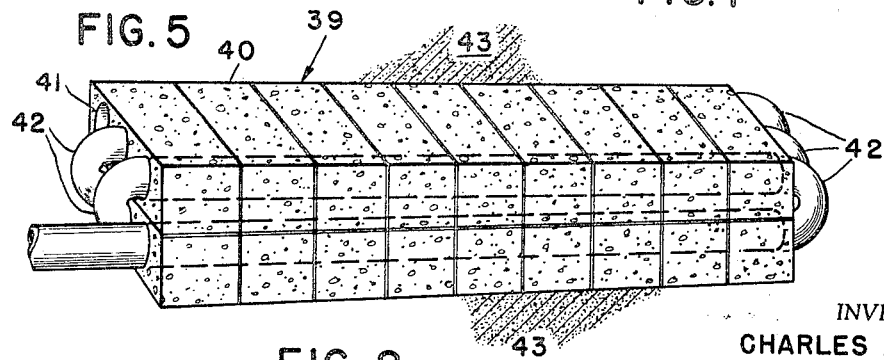
FIG. 8
INVENTOR.
CHARLES A. CASE

United States Patent Office 3,422,010
Patented Jan. 14, 1969

---

3,422,010
METHOD AND APPARATUS FOR TREATING FLOWING SEWAGE IN A NITRIFICATION LINE
Charles A. Case, Box 492, Oak Ridge, N.C. 27310
Filed Mar. 25, 1965, Ser. No. 442,661
U.S. Cl. 210—50      14 Claims
Int. Cl. C02b 1/20; C02b 1/34

---

ABSTRACT OF THE DISCLOSURE

An apparatus and method for purifying sewage in a nitrification line, increasing the percolation rate of the surrounding soil, and protecting that soil from the adverse effects of seeping sewage wherein aluminum sulfate, calcium hydroxide and calcium hypochlorite are selectively applied in separated chambers to purify the sewage flowing therethrough and the resulting fluid is dispersed in the surrounding soil.

---

This invention relates to a new and useful apparatus and method for purifying sewage in a nitrification line, increasing the percolation rate of the surrounding soil, and protecting that soil from the adverse effects of seeping sewage heretofore known in the art.

Use of the septic tank for individual households was developed in order to bring the advantages of water carried waste disposal to rural homes when availability of power began to make water pressure systems possible in rural areas. The postwar housing projects soon made evident the many problems involved in the successful construction and operation of septic tank systems. Attendant problems to the installation and operation of such a system are soil-clogging by the attempted passage of slime or sludge from the septic tank into the surrounding soil, system failure whereby sewage fluid escapes and stands on the surface thus providing an extremely undesirable appearance and odor, and generally overloading the septic tank system because of poor circulation or untimely maintenance. To meet this problem, efforts have been made to keep relatively large particles out of the sewage effluent so that the rate of infiltration of the particleless sewage becomes identical with the rate at which the soil will transport water by percolation. Additionally, there is a need for greater fluid purification so that there is little danger of soil destruction by the passage into the soil of harmful acid forming bacteria and the formation of a slime or sludge over the surrounding surface which causes the previously mentioned clogging. I have made investigations on the feasibility of ground disposal of various wastes by ion-exchange phenomena and this has yielded additional information concerning system clogging and has suggested a method and apparatus for overcoming this deficiency.

Since presently known septic tank systems and nitrification lines do not completely anticipate the problems enumerated above, it is among the objects of my invention to provide an apparatus for installation in a normally used nitrification line that operates by ion-exchange to settle out large sewage particles and decompose this residue to produce a highly purified sewage fluid for eventual infiltration into the surrounding soil without the normally accompanying harmful effects.

Another object of the present invention is to provide a method for clearing and purifying sewage fluid that will produce no harmful effects on the surrounding soil when that fluid is passed therein.

Still another object of the present invention is to provide an apparatus to clear and purify sewage fluid that is simple in construction, readily accessible for maintenance and economical in cost.

Yet another object of the present invention is to provide an apparatus of the above-described type that will alleviate the clogging and filling disadvantages known to exist in conventional systems.

Still another object of the present invention is to provide alternative embodiments of the above-described apparatus that will be suited for a particular application under existing circumstances.

Yet still another object of the present invention is to provide an apparatus and method of sewage clearing and purification that will eliminate unsightly surface ponding and odors associated therewith and additionally eliminate the bacteria caused acidity of these ponds that adversely affects the soil.

These and other objects of the present invention will become apparent from the consideration of the accompanying drawings constituting a part hereof in which like characters of reference designate like parts and in which:

FIG. 1 is a perspective view of the preferred embodiment of the present invention showing the positioning of a chemical treating station in the path of a nitrification line;

FIG. 2 is a side elevational view of the chemical treating station of FIG. 1 showing the buoyant and automatic metering devices for effecting the injection of preselected chemicals into the nitrification line;

FIG. 3 is a fragmented and elevational view taken along the line 3—3 of FIG. 2 showing the metering apparatus;

FIG. 4 is a side elevational sectional view of the settling basin positioned directly in the nitrification line showing the first, second and seepage compartments;

FIG. 5 is a sectional end view taken along the line 5—5 of FIG. 4 showing the separating wall between the first and second compartment and the syphon tube positioned therein;

FIG. 6 is an alternative embodiment of the sewage clearing and purifying apparatus illustrating a space conserving arrangement of chemical chambers and an injection tube disposed therein for permitting the flow of chemicals from the chambers into the nitrification line;

FIG. 7 is a sectional and fragmented end view taken along the line 7—7 of FIG. 6 showing the injection tube and its position with respect to the nitrification line; and FIG. 8 is an alternative embodiment of the settling basin seepage compartment of FIG. 4, and more specifically a tiered block arrangement for use in sewage disposal irrigation beneath the surface of the ground for sub-surface purification purposes.

Referring first to FIG. 1, the structure there shown comprises the initial portion of the nitrification line 10 extending from the conventionally used septic tank 11 to the specifically positioned chemical treating station generally designated 12. Station 12 is a rectangular bin made of a convenient water resisting material and compartmented to form a transverse section known herein as the sampling raceway 13 and three additional compartments having an end common to raceway 13. These three compartments will be designated as an alum chamber 14, a lime chamber 15, and a chlorine chamber 16.

Raceway 13 contains a plurality of metering devices 17 each comprised of a horizontal pivot member 18, a buoy carrying arm 19, a metering container 20, and a buoy 21 for lifting the device as the fluid level within raceway 13 rises. As can be seen in FIG. 2, metering container 20 accumulates a quantity of fluid determined by the positioning and size of buoy 21 as the fluid level within raceway 13 commences to rise. Arm 19 and horizontal member 18 are hollow and connected and thus provide a path for collected fluid flow from metering container 20 into a particular chamber (14, 15 or 16) once the fluid within raceway 13 reaches a level sufficient to gravity-actuate the trapped metered quantity within container 20. The maximum elevation of device 17 is illustrated in FIG. 2 by the designated broken lines outlining the device. Hence it can be seen that only when the fluid within raceway 17 reaches a maximum level, will the collected and metered quantity within container 20 be moved and transferred into a particular chamber (14, 15 and 16). Chamber 14 has an aperture 22 positioned in the common wall at the contained fluid surface that will allow solution flow from chamber 14 into raceway 13 when the fluid level within chamber 14 is elevated. As a practical matter, the collected sewage trapped by metering device 20 causes a minute rise in that chamber's solution surface height and thus effects solution flow through aperture 22 from chamber 14 into raceway 13. Similarly, chamber 15 has an aperture 23 connecting it to raceway 13, and chamber 16 has an aperture 24 which by-passes raceway 13 by means of an extending tube 25 and injects solution from chamber 16 at a remote location in the settling basin later to be more particularly described.

Chamber 14 is normally supplied with approximately fifty pounds of $Al_2(SO_4)_3$ commonly known as aluminum sulfate. Obviously, any one of several well known alum compounds such as $AlK(SO_4)_2 \cdot 24H_2O$, $AlNH_4(SO_4)_2 \cdot 24H_2O$ or $AlNa(SO_4)_2 \cdot 24H_2O$ may be used in lieu of aluminum sulfate to provide aluminum ions for this solution. Chamber 15 contains approximately one hundred pounds of $Ca(OH)_2$, commonly known as calcium hydroxide or lime in solution to provide the necessary hydroxide ions. Compartment 16 contains approximately twenty pounds of $Ca(ClO_2)_2$ commonly known as calcium hypochlorite in solution. Obviously any one of several known chlorite compounds may be used to provide chlorine for this solution such as $Ca(ClO)_2$, $NaClO$ or $CaCl(ClO)$ which is passed through extending tube 25 and deposited in compartment 26 of a settling basin generally designated 27. Chambers 14, 15 and 16 are provided with a surplus of the above-specified chemicals in order to maintain a saturated solution in each and thus avoid the necessity of frequent replenishing of these particular compounds.

As sewage fluid moves from septic tank 11 through nitrification line 10 into raceway 13, it is sampled and injected into chambers 14, 15 and 16 thus causing a preselected quantity of chamber solution to be moved into raceway 13 for flow therefrom. Note that the fluid level in raceway 13 must reach the bend height 28 of syphon 29 before it is displaced into nitrification line extension 10. As aluminum sulfate and calcium hydroxide are combined, a chemical reaction occurs and is expressed by the following ionic equation:

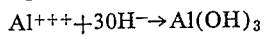

$$Al^{+++} + 3OH^- \rightarrow Al(OH)_3$$

The injection of aluminum sulfate and calcium hydroxide into raceway 13 occurs when the fluid level there reaches height 28 since it is only then that metering devices 17 are positioned to allow the flow of the collected sewage within containers 20 into the respective chambers. Thus aluminum ions and hydroxide ions are deposited at the surface of the sewage fluid contained in raceway 13. The location of syphon 29 causes the contained fluid to flow from the bottom of the raceway first out of the raceway through the syphon and into compartment 30 of settling basin 27. Since the aluminum ions and hydroxide ions flow with the surface sewage fluid contained in the raceway, they are also deposited and begin substantially to react to form aluminum hydroxide at the surface of the sewage fluid within compartment 30. As this reaction commences, the aluminum hydroxide ($Al(OH)_3$) in the form of a gelatin substance is created and this substance slowly settles to the bottom of compartment 30 collecting suspended particles from the fluid contained therein as it moves downwardly. This has a tendency to clear the fluid as the suspended particles are engulfed and settle to the bottom of the compartment. The metering apparatus is so designed that there is an addition of more calcium hydroxide than is needed for the formation of aluminum hydroxide, and this surplus will cause the formation of ammonium hydroxide from which there is emitted ammonia gas ($NH_3$). This has a tendency to decrease the amount of accumulated gelatin substance which has become rather compact by virtue of accumulating suspended particles in the sewage fluid as it forms and settles to the bottom of the compartment since the settled black compound or scum is being changed over a period of time to a white substance as ammonia gas is emitted. This, of course, has the effect of reducing the amount of occupied space by the settled material within compartment 30 since the formed compound or scum is being diminished as it changes to a white substance.

Bacteria present in the sewage fluid from food substances passed as waste in the sewage system will also assist in compartment 30 of settling basin 27 to accelerate decomposition of the settled compound or scum. The decomposition achieved by bacteria in this compartment is essentially a repetition of that function normally performed within the septic tank of a conventional system.

After the gelatin compound and its collected particles are settled, the bacteria has operated to assist the decomposition and the ammonia gas has been emitted the remaining fluid in the first compartment of basin 27 has achieved a relatively pure state.

Compartment 30 has an access vent 55 intersecting its upper wall and extending from that wall approximately four to eight inches above the ground. This vent will permit a rather convenient periodic inspection of the compartment and provide an aperture for pumping any remaining substance within the compartment that has avoided decomposition.

This relatively pure water within the first compartment is then syphoned by means of syphon 31 to a second compartment 26 where there is being simultaneously injected from chamber 16 of station 12 preselected quantities of calcium hypochlorite (chlorine) to further assist in the purification of that water and to eliminate odors formed by the above-mentioned bacteria that has moved into that compartment with the water that has entered by destroying that bacteria. Note that conduit 25 extends through line 10 and compartment 30 into second compartment 26 and is held secure within the separating wall 32 isolating the first compartment 30 from the second compartment 26. The addition of a sufficient amount of chlorine to achieve a purification of the contained water to a greater extent than normally accomplished by city water systems has the additional beneficial effect of eliminating any clogging effect caused by that bacteria. This clogging effect has been critically analyzed by many authorities in this field and is generally known to be a great disadvantage of ordinary septic tank and nitrification line systems.

A second isolating wall 33 contains a relatively lower positioned syphon 34 for passing the greatly cleared and purified water from the second compartment 26 into the downwardly sloping seepage compartment 35. Here the fluid is uniformly and continuously diffused through the walls 36 of the basin into the surrounding soil 37 as it flows along the compartment's downward slope. This diffusion utilizes a "side wall effect" since the carried water has a tendency to move inwardly and upwardly through the porous cement walls as much as twelve inches for a rather large exposure to the surrounding soil for passage therethrough. The addition of calcium hydroxide as, in this application, will cause the contained water to rise to an even high wall level for diffusion.

It is important to note that basin 27 makes possible the utilization of a principle known as "dosing" in that the first compartment 30 of the basin 27 has a capacity of approximately 150 gallons thereby allowing a relatively large quantity of sewage fluid to accumulate during clearing, purifying and decomposing in that compartment. The fluid level within compartment 30 must reach the bend peak 38 of syphon tube 31 connecting the first and second compartment before there is passage of fluid from compartment 30 to compartment 26. The result of such intermittent movement of the collected fluid from one compartment to another gives the dosing effect since it allows sufficient time between water passage into seepage compartment 35 for the surrounding soil 37 to become relatively dehydrated and consequently much more receptive to infiltration and movement by relatively clear and purified water. The soil 37 does not have to become absolutely dry in order to allow water seepage or passage, but it does reach a state of relative dryness as compared to a system that would be constantly exposed to a steady trickle or seepage of fluid. The size of the first compartment 30 could be varied and would depend on the needs of the particular situation and amount of use required.

As an alternative offered should space or finances so dictate, the block form flow circuit of FIG. 8 is offered in lieu of seepage compartment 35 of basin 27 of FIG. 4 since this sealed filter bed offers advantages heretofore unknown in conventional systems. The filter bed generally designated 39 comprises a cement block configuration using conventional blocks 40 having preformed apertures 41 therein and arranged so as to provide a plurality of parallel sealed conduits which can be connected by elbows 42 to form one continuous pipe line. It is recommended that such a filter bed 39 be positioned as a substitute for seepage compartment 35 of basin 27 so as to utilize the injection of chlorine for the destruction of odors and bacteria. The particular construction of filter bed 39 affords great savings in space and installation effort since the length of the illustrated embodiment need only be approximately one quarter of a normally installed nitrification line. Additionally, the porous cement blocks afford maximum infiltration of fluid from within the formed conduit into the surrounding soil 43, and the cement walls of this structure will also utilize the "side wall effect" previously discussed. Obviously, a great many variations may be achieved in so far as the number of parallel paths of flow contained within the block structure since they could be increased by means of tiering or stacking layers of blocks one upon the other. This again would depend upon the needs of the particular situation. The presence of the chemical station discussed above affords maximum efficiency in the use of such a unit since there would be little or no clogging of the cement pores by sewage or slime since these would have been substantially eliminated by the process described above.

Intensive testing has given results far above those of conventionally used systems when the filter bed 39 is used directly from the septic tank without the utilization of a chemical treating station as described above. Conventional systems normally utilize an extended nitrification line joining the septic tank and extending for several hundred feet to provide a flow passage for the sewage fluid so that it may be dispersed into the surrounding soil. The prior art shows all such nitrification lines to be unsealed at junction points or otherwise open thus encouraging excessive amounts of fluid flow at these junction points or openings and resulting in surface ponding and odor from surface H₂O. Where use of toilet and kitchen appliances is not excessive, filter bed 39 is fault free in comparison to those conventionally used systems since the pores within the cement blocks used in this structure simulate soil pores and cause contained fluid to move uniformly through just as it would through unclogged soil.

The alternative embodiment illustrated in FIG. 6 is merely a less elaborate chemical treating station positioned between septic tank 11 and settling basin 27 where the economics and space considerations of a particular situation demand treatment on a smaller scale. Chamber 44 contains $Al_2(SO_4)_3$ and chamber 45 contains $Ca(OH)_2$ just as chamber 14 and 15 contained in the preferred embodiment illustrated in FIG. 1. A solution injection tube 46 intersects nitrification line 10, and extends from both compartments 44 and 45 into that line. As illustrated in FIG. 7, tube 46 is isolated into two sections by baffle 46a and each section is notched to permit entry of solution from chambers 44 and 45 into line 10. The tube section extending from chamber 44 has a relatively deep and narrow notch 47 representing a preselected injection of alum under given conditions while tube section extending from chamber 45 has a notch 48 of approximately twice the width and one-half the depth of notch 47. These particular configurations are fashioned so as to permit entry of approximately twice as much lime as alum.

The actual injection of chemical solution from chambers 44 and 45 takes place by fluid passing through line 10 and across notches 47 and 48 at a relatively rapid rate which creates a partial vacuum within the sections of tube 46 extending from chambers 44 and 45 and thus causes a flow of solution from those chambers into line 10. As the flow within line 10 decreases, the partial vacuum disappears and there is a flow of sewage fluid through notches 47 and 48 into tube 46 and eventually into chambers 44 and 45. Thus fluid level 49 is always maintained constant since there will be sewage fluid moving into those chambers either at the beginning of flow through line 10 or at that flow's termination. The solutions contained within chambers 44 and 45 are, as earlier described for chambers 14, 15 and 16 in station 12, kept in a saturated condition so as avoid frequent replenishing of the chemicals contained therein.

It is obvious that the filter bed 39 of FIG. 8 is readily adaptable in combination with the arrangement of FIG. 6 rather than the utilization of compartment 35 of basin 27 if that be desirable. Again, economics and space play a vital role in the ultimate determination as to which embodiment should be used.

The treating station 12 of FIG. 1 is provided with a sectionalized lid generally designated 50 having a first section 51 and a second section 52 for easy access and maintenance. Lid section 51 extends beyond the adjoining wall of raceway 13 and compartments 14, 15 and 16 so that it might be removed without the necessity of uncovering the entire station when there is a need to replenish the chemicals contained within those respective compartments. This would require a minimum of digging or soil destruction when access to station 12 is desired. Similarly, chambers 44 and 45 of FIG. 6 each contain a lid 53 and 54 for access to the interiors of those chambers for maintenance and chemical replacement.

There are no specific requirements as to burial depth of the principal and alternate embodiments of this invention since it is assumed they will be placed within the ground just as are conventional septic tank and nitrification systems.

Obviously, when space dictates, the chemical treating stations of the present invention and its embodiments could be placed within the main septic tank enclosure since this would require a very minimum of lot footage. It might be necessary under those conditions to extend the normal septic tank length to accommodate whichever embodiment is desired.

Obviously, many modifications and variations may be made in the construction and arrangements of the chemical treating stations as well as the settling basin and filter bed and as well as the other phases of the present inventive concept in the light of the above teachings without departing from the real spirit and purpose of this invention. Such modifications of parts and alternatives as well as use of mechanical equivalents to those herein illustrated and described are reasonably included and modifications are contemplated.

What is claimed is:
1. An apparatus for treating sewage flow from a septic tank comprising in combination: a sewage flow line extending from said septic tank to a chemical treating station and operable with said station for flow therethrough, said station having a plurality of solution containing chambers positioned for solution exchange with said flow, said chambers being adapted for containing solutions of aluminum sulphate, calcium hydroxide and calcium hypochlorite; a basin surrounded by the soil receiving said flow from said station, said basin having a series of compartments and means for allowing intermittent movement of said flow through said compartments; means for transferring preselected quantities of said aluminum sulphate and calcium hydroxide solutions to said flow at said chemical station; means for transferring a preselected quantity of said calcium hypochlorite solution to said flow in a compartment of said basin compartment series; and means for collecting and dispersing said flow from said basin through the surrounding soil, said collecting means having porous cement dispersing walls to encourage uniform fluid flow therethrough whereby sewage flow moves from the septic tank to the chemical treating station, receives preselected quantities of aluminum sulphate and calcium hydroxide solution from the containing chambers, moves to a basin compartment and receives a preselected quantity of calcium hypochlorite and is collected for uniform dispersion throughout the surrounding soil.

2. An apparatus as defined in claim 1 and in which the collecting and dispersing means is an elongated cement tile having a porous wall structure to simulate the porous configuration of the surrounding soil and induce uniform passage of fluid therethrough.

3. An apparatus as defined in claim 1 and in which the collecting and dispersing means is a sealed filter bed comprising tiered rows of cement blocks having apertures to form a common passage therein, said formed passage having a porous wall structure to simulate the porous configuration of the surrounding soil and induce uniform passage of fluid therethrough.

4. An apparatus for treating flowing sewage in a nitrification line comprising in combination: a chemical treating station having an alum chamber, a lime chamber, a chlorine chamber and a raceway, said chambers bordering said raceway for chemical exchange therewith, and said raceway forming a segment of said nitrification line, said chambers being adapted for containing solutions of aluminum sulphate, calcium hydroxide and calcium hypochlorite in said alum, lime and chlorine chambers respectively; means for transferring from 10 to 20 milliliters of said aluminum sulphate solution and from 200 to 250 milliliters of calcium hydroxide solution from said lime and chlorine chambers to said raceway, said transferred aluminum sulphate and calcium hydroxide solutions being equal in volume to said first transferred quantities of sewage from said raceway to said chambers; a settling basin surrounded by the soil following said raceway and connected thereto for fluid flow having a first compartment, a second compartment and a seepage compartment, said seepage compartment sloping downwardly relative to said first and second compartments and extending therefrom; syphon means for transferring said raceway aluminum sulphate and calcium hydroxide solutions and sewage from said raceway to said settling basin first compartment for chemical treatment when said sewage and solutions reach a selected volume in said raceway; syphon means for moving treated sewage fluid from said first to said second compartment when said sewage reaches a selected volume; syphon means for moving treated and relatively pure sewage from said second compartment to said seepage compartment when said sewage in said second compartment reaches a selected volume; means for transferring from 50 to 100 milliliters of said calcium hypochlorite solution from said chlorine chamber to said basin second compartment, said transferred quantity of solution being equal in volume to said first transferred quantity of sewage from said raceway to said chlorine chamber whereby a portion of the sewage passing through the raceway is transferred to the alum and lime chambers displacing an equal amount of aluminum sulphate and calcium hydroxide solution back into the raceway for treating the moving sewage, the sewage passes to the settling basin first compartment where it is relatively purified, the relatively purified sewage is then passed to the settling basin second compartment where a predetermined volume of calcium hypochlorite is injected for further purification and this highly purified sewage is then passed to the seepage compartment for flow and diffusion into the surrounding soil.

5. An apparatus for treating flowing sewage in a nitrification line comprising in combination: a chemical treating station forming a segment of said nitrification line, said station being adapted for containing solutions of aluminum sulphate, calcium hydroxide and calcium hypochlorite; means for transferring quantities of said aluminum sulphate and said calcium hydroxide solutions to said station; a settling basin surrounded by the soil following said station and connected thereto for fluid flow; means for transferring said aluminum sulphate and calcium hydroxide solutions and sewage from said chamber to said basin for chemical treatment; separate means for transferring quantities of said calcium hypochlorite solution to said basin for fluid purification; and means for uniformly dispersing said treated and purified fluid throughout the surrounding soil whereby sewage passing through the chemical station is mixed with a quantity of aluminum sulphate and calcium hydroxide solutions, the sewage and solutions passed to the settling basin where it is relatively purified, the relatively purified sewage is then mixed with a predetermined quantity of calcium hypochlorite solution for further purification and this highly purified sewage is then dispersed for uniform flow throughout the surrounding soil.

6. An apparatus for treating flowing sewage in a nitrification line comprising in combination: a chemical treating station having an alum chamber and a lime chamber, said chambers bordering said station for chemical exchange therewith and said station forming a segment of said nitrification line, said chambers being adapted for containing solutions of aluminum sulphate and calcium hydroxide in said alum and lime chambers respectively; means for transferring quantities of said aluminum sulphate and calcium hydroxide solutions from said chambers to said station; a settling basin surrounded by the soil following said station and connected thereto for fluid flow having a first compartment, a second compartment and a seepage compartment, said seepage compartment sloping downwardly relative to said first and second compartment and extending therefrom; syphon means for moving treated sewage fluid from said first to said second compartment when said sewage reaches a selected volume; syphon means for moving treated and relatively pure sewage from said second compartment to said seepage compartment for uniform dispersion throughout the surrounding soil when said sewage in said second compartment reaches a selected volume whereby a quantity of aluminum sulphate and calcium hydroxide solution is transferred into the moving sewage, the sewage passes to the settling basin first compartment where it is further purified and this highly purified sewage is then passed to the seepage compartment for flow and diffusion into the surrounding soil.

7. An apparatus for treating flowing sewage in a nitrification line comprising in combination: a chemical treating station having an alum chamber and a lime chamber, said chambers proximate said station for chemical exchange therewith, said station forming a segment of said nitrification line, and said chambers adapted to contain solutions of aluminum sulphate and calcium hydroxide in said alum and lime chambers respectively; means for transferring quantities of said aluminum sulphate and calcium hydroxide solutions from said chambers to said station; a settling basin surrounded by the soil following said station and connected thereto for flow and sewage treatment having a first compartment, a second compartment and means for dispersing treated sewage fluid uniformly throughout the surrounding soil; syphon means for moving treated sewage fluid from said first to said second compartment when said fluid reaches a selected volume; and syphon means for moving said treated fluid from said second compartment to said dispersing means whereby a quantity of aluminum sulphate and calcium hydroxide solution is transferred into moving sewage, the sewage passes to the settling basin first compartment where it is relatively purified, the relatively purified sewage is then passed to the settling basin second compartment where it is further purified and this highly purified sewage is then uniformly dispersed for movement throughout the surrounding soil.

8. An apparatus as defined in claim 7 and in which the fluid dispersing means is a filter bed having at least one sealed row of adjacent cement blocks with a plurality of apertures therein, said blocks positioned to form a plurality of parallel open-end conduits, and a plurality of connecting elbows joining said conduit open-ends to form a single continuous sealed conduit for fluid flow therethrough, said cement blocks having porous walls to simulate the porous configuration of the surrounding soil and induce uniform fluid flow therethrough.

9. The method of treating flowing sewage in a nitrification line surrounded by the soil comprising the steps of: injecting quantities of aluminum sulphate and calcium hydroxide simultaneously into sewage fluid moving within a nitrification line at a preselected location; collecting the solution quantities and fluid sewage at a second location for settling suspended particles within the fluid sewage as the aluminum ions and hydroxide ions combine to form a gelatinous and particle-engulfing substance; transferring the relatively purified sewage fluid from which suspended particles have been removed to a third location; injecting a quantity of calcium hypochlorite solution into the sewage fluid at the third location to further purify the sewage fluid and eliminate bacteria-caused odors; and removing the further treated and purified sewage fluid from the third location and uniformly dispersing it throughout the surrounding soil.

10. The method of treating flowing sewage in a nitrification line surrounded by the soil comprising the steps of: injecting quantities of aluminum sulphate and calcium hydroxide simultaneously into sewage fluid moving within a nitrification line at a first location; collecting solution quantities and fluid sewage at a second location for settling suspended particles within the sewage as the aluminum ions and hydroxide ions combine to form a gelatinous and particle-engulfing substance; transferring the relatively purified sewage fluid from which suspended particles have been removed from a second location to a third location to further purify the sewage fluid and eliminate bacteria-caused odors; and removing the further treated and relatively purified sewage fluid from the third location to a fourth location and uniformly dispersing the fluid throughout the surrounding soil.

11. The method of treating flowing sewage in a nitrification line surrounded by the soil comprising the steps of: injecting aluminum sulphate and calcium hydroxide solution simultaneously into sewage fluid moving within a nitrification line at a preselected location; collecting the solution quantities and fluid sewage at a second preselected location for settling suspended particles within the sewage as the aluminum ions and hydroxide ions combine to form a gelatinous and particle-engulfing substance; transferring the relatively purified sewage fluid from which suspended particles have been removed to a preselected third location to further purify the sewage fluid and eliminate bacteria-caused odors and dispersing the treated and further purified sewage fluid uniformly throughout the surrounding soil.

12. A filter bed adapted for installation in the soil for fluid flow comprising: at least one sealed row of adjacent cement blocks having a plurality of apertures therein, said blocks positioned to form a plurality of parallel open-end conduits; and a plurality of connecting elbows joining said conduit open-ends to form a single continuous sealed conduit for fluid flow therethrough, said cement blocks having porous walls to simulate the porous configuration of the surrounding soil and induce uniform fluid flow therethrough.

13. A cement block filter bed adapted for installation in the soil for fluid flow comprising a plurality of sealed cement block rows, each of said row-forming blocks having a plurality of apertures therein, said blocks positioned to form a plurality of parallel open-end conduits; and a plurality of connecting elbows joining said conduit open-ends to form a single continuous sealed conduit for fluid flow therethrough, said cement blocks having porous walls to simulate the porous configuration of the surrounding soil and induce uniform fluid flow therethrough.

14. An apparatus for treating flowing sewage in a nitrification line comprising in combination: a chemical treating station having an alum chamber, a lime chamber, and chlorine chamber, said chambers proximate said station for chemical exchange therewith, and said station forming a segment of said nitrification line for sewage flowing therethrough, and said chambers adapted to contain solutions of aluminum sulphate, calcium hydroxide and calcium hypochlorite in said alum, lime and chlorine chambers respectively; means for transferring quantities of said aluminum sulphate and calcium hydroxide solutions from said alum and lime chambers to said station; a settling basin surrounded by the soil following said station and connected thereto for flow therefrom having a first compartment, a second compartment and means for dispersing fluid uniformly throughout the surrounding soil; syphon means for moving treated sewage fluid from said first to said second compartment when said fluid reaches a selected volume; means for transferring a quantity of said calcium hypochlorite solution from said chlorine chamber to said second compartment; and syphon means for moving said treated fluid from said second compartment to said dispersing means whereby a quantity of aluminum sulphate and calcium hydroxide solution is transferred into moving sewage, the sewage passes to the settling basin first compartment where it is relatively purified, the relatively purified sewage is then passed to the settling basin second compartment where it receives a quantity of calcium hypochlorite solution and is further purified and this highly purified sewage is then uniformly dispersed for movement throughout the surrounding soil.

References Cited

UNITED STATES PATENTS

| 1,254,906 | 1/1918 | Henderson | 61—10 X |
| 1,633,080 | 6/1927 | Engle | 210—532 |
| 2,674,337 | 4/1954 | Noe | 61—10 X |
| 2,782,604 | 2/1957 | Mixon | 61—11 |
| 2,938,630 | 5/1960 | Novak | 210—15 X |

FOREIGN PATENTS

| 3,060 | 1/1932 | Australia. |
| 900 | 1885 | Great Britain. |
| 149 | 1898 | Great Britain. |

MICHAEL E. ROGERS, *Primary Examiner.*

U.S. Cl. X.R.

210—52, 170, 199, 532